United States Patent
Witty

(10) Patent No.: US 7,386,974 B2
(45) Date of Patent: Jun. 17, 2008

(54) MOWING APPARATUS AND METHOD

(75) Inventor: Craig Witty, Winnetka, IL (US)

(73) Assignee: O-Sage LLC, Winnetka, IL (US)

( * ) Notice: Subject to any disclaimer, the term of this patent is extended or adjusted under 35 U.S.C. 154(b) by 247 days.

(21) Appl. No.: 10/996,959

(22) Filed: Nov. 24, 2004

(65) Prior Publication Data

US 2006/0107643 A1    May 25, 2006

(51) Int. Cl.
*A01D 34/53* (2006.01)
(52) U.S. Cl. .............................. 56/249; 56/251; 56/294
(58) Field of Classification Search ................ 56/249, 56/251, 294, 12.1, 7
See application file for complete search history.

(56) References Cited

U.S. PATENT DOCUMENTS

| | | | |
|---|---|---|---|
| 468,075 A | 2/1892 | Wood | |
| 1,644,889 A * | 10/1927 | O'Byrne et al. | 56/294 |
| 1,823,219 A * | 9/1931 | Vimtrup | 56/249 |
| 1,837,725 A | 12/1931 | Newton et al. | |
| 1,992,119 A | 2/1935 | Campion | |
| 2,016,987 A * | 10/1935 | Cheadle | 56/294 |
| 2,183,544 A * | 12/1939 | Clemson | 56/294 |
| 2,309,635 A * | 1/1943 | Edwards | 56/237 |
| 2,449,042 A | 9/1948 | Abbrecht | |
| 2,517,184 A | 8/1950 | Elliott et al. | |
| 2,535,185 A * | 12/1950 | Adamczyk | 56/294 |
| 2,599,883 A | 6/1952 | Aske | |
| 2,665,539 A * | 1/1954 | Cawood | 56/249 |
| 2,685,774 A | 8/1954 | Williams | |
| 2,759,321 A | 8/1956 | Force | |
| 2,777,274 A | 1/1957 | Beaumont | |
| 2,790,293 A | 4/1957 | Crotty | |
| 2,929,190 A * | 3/1960 | Woody | 56/249 |
| 3,068,632 A | 12/1962 | Postlewait et al. | |
| 3,863,429 A | 2/1975 | Beusink et al. | |
| 3,964,243 A | 6/1976 | Knipe | |
| 3,979,887 A * | 9/1976 | Stewart | 56/13.5 |
| 4,345,419 A | 8/1982 | Chandler | |
| 4,532,708 A | 8/1985 | Mensing | |
| 4,563,867 A | 1/1986 | Bokon | |
| 4,653,255 A * | 3/1987 | O'Brien et al. | 56/249 |
| 4,916,887 A | 4/1990 | Mullet et al. | |
| 5,019,113 A | 5/1991 | Burnell | |
| 5,400,576 A | 3/1995 | Smith | |
| 5,867,973 A | 2/1999 | Geir | |
| 6,321,518 B1 | 11/2001 | O'Hagan | |
| 6,543,210 B2 | 4/2003 | Rostoucher et al. | |
| 6,618,925 B2 | 9/2003 | Rickheim | |

OTHER PUBLICATIONS www.lawnmowerworld.co.uk, Allen Scythe 1930.

* cited by examiner

*Primary Examiner*—Thomas B Will
*Assistant Examiner*—Alicia Torres
(74) *Attorney, Agent, or Firm*—Michael Catania; Greer, Burns & Crane; James Folker

(57) ABSTRACT

An apparatus (20) for mowing vegetation is disclosed herein. The apparatus (20) generally includes a reel mechanism (21) and a cutting mechanism (22). The reel mechanism (21) preferably includes a plurality of reel bars (30) that rotate in a first direction. The cutting mechanism (22) preferably includes a plurality of cutting blades (40) that rotate in a second direction opposite of the first direction. Each of the plurality of cutting blades (40) is preferably disposed concentrically within the plurality of reel bars (30).

48 Claims, 8 Drawing Sheets sequential cutting paths

MOWING APPARATUS AND METHOD

CROSS REFERENCES TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to mowing apparatuses. More specifically, the present invention relates to an apparatus for mowing lawn grass.

2. Description of the Related Art

Lawn mowers are well known devices used for cutting grass and commingled weed plants in order to maintain the appearance of an outdoor area such as a residential lawn or golf course. There are many types of lawn mowers, including rotary mowers and reel mowers. Additionally, many different cutting blades or cutter heads are known for use with lawn mowers and other plant cutting devices.

The gasoline-powered rotary mower is by far the dominant grass cutting mechanism on the market today. Less commonly, rotary mowers are powered by mains- or battery-operated electric motors. In the most familiar rotary configuration, a heavy steel blade with sharpened edges at opposing distal ends is spun at high speed around a central pivot point inside a cylindrical, open-bottomed chamber that is moved across the lawn. The blade is commonly shaped to create a zone of low air pressure above the grass in order to lift the individual shafts into the plane of the spinning blade. The power mower housing functions to prevent injury to the operator and to control the direction of discharge of the clippings generated during operation.

Different rotary cutting blade configurations are used for a variety of reasons. Burnell, in U.S. Pat. No. 5,019,113, discloses a rotary lawn mower assembly having easily detachable replacement blades. Mensing, in U.S. Pat. No. 4,532,708, discloses a blade assembly with a plurality of cutting segments arranged end to end for improved cutting. Knipe, in U.S. Pat. No. 3,964,243, shows a rotary cutting blade with detachable tines used to blow grass clippings from the mower's path.

Mullet, et al, in U.S. Pat. No. 4,916,887 discloses a rotary mulching mower using a multiplicity of cutting blades within the mower housing. Each cutting blade rotates through a different plane to cut the grass clippings into mulch. Geier, in U.S. Pat. No. 5,867,973, shows a single rotary blade consisting of multiple adjustable cutting edges to accomplish the mulching function.

Irrespective of the fact that rotary power mowers are ubiquitous, they have several significant drawbacks. The primary drawback associated with the rotary power mower is that a free-spinning steel blade is a relatively inefficient grass cutting instrument. Since a shaft of grass has little mass and can be easily deflected, the mower blade must be spun at very high power levels in order to adequately perform the cutting function. It is not uncommon to find standard rotary mower engines rated at six horsepower and above. As a consequence, in a gasoline-powered rotary mower the engine is large, noisy, creates significant air pollution, and uses relatively large amounts of energy per blade of grass cut. It was estimated in 2003 by William A. Burke, Chairman of the California South Coast Air Quality Management District, that an older gas-powered lawn mower pollutes as much in one year of typical use as a new car driven more than 86,000 miles.

Electric rotary mowers generate lower levels of noise and no (local) air pollution, but suffer from the same inherent cutting inefficiencies. As a result, they tend to be heavy and expensive due to the large battery capacity needed to generate the required inertial cutting forces.

Regardless of the power source, because the blade of the rotary mower is essentially a sharpened, if not always sharp, flail, the cut edge at the top of the living shaft of grass is often torn or ragged. A ragged grass cut is undesirable, both in terms of the appearance of the lawn and for the health of the grass. In sandy or debris-strewn soil, blades spinning at high speed erode quickly and require frequent sharpening or replacement.

Another disadvantage presented by a conventional rotary mower is the inherent danger of unintended contact with the high-speed blade. The blade is a direct threat if the user comes in contact with it, and an indirect threat if it propels an object from the housing. Grievous injuries have been sustained by both experienced and inexperienced users of rotary power mowers due to both of these conditions.

Tall grass presents another problem for conventional rotary mowers. The tendency is for tall grass to be flattened as the mower housing passes over. If the grass is very long, the housing will hold it to the ground so that it is not effectively cut.

It is believed that no current rotary lawn mowing device sufficiently addresses these problems.

Another common, and historically very significant, grass cutting mechanism is the reel mower. This device is typically constructed with a set of four to ten heavy steel blades fixed in a cylindrical form and rotated about the axis of the cylinder parallel to the ground and perpendicular to the direction of travel of the mower. The blades are generally twisted in a helical form, and positioned to graze the leading edge of a horizontal bed knife suspended at the desired cutting distance above the ground. As the mower is pushed forward, the blades of grass are swept against the bed knife and sheared between the knife and the passing helical blade. In the past, such reel mowers have been powered by both gasoline and electric motors, but the most common configuration, historically and at the present, is the human-powered "push mower".

Compared to rotary mowers, revolving blade reel mowers have a great advantage in terms of cutting efficiency. The bed knife and revolving helical blades interact to create a 'scissors' action that is not only energy efficient as a cutting mechanism, but which also creates a clean cut at the top of the living shaft of grass. Lawns that are routinely cut with reel mowers, such as is commonly the practice at many golf courses, have a groomed appearance that is generally considered superior to lawns cut with rotary mowers. There is also a consequent improving effect on the health of the grass.

There have been numerous variations in the design of the basic reel mower. Many deal with the need to accurately preserve the gap between the bed knife and the revolving blades in order to maintain efficient cutting action. Rickheim, in U.S. Pat. No. 6,618,925, discloses a method of constructing a bed knife assembly that restricts the movement of the bed knife blade relative to a clamp plate. Bokon, in U.S. Pat. No. 4,563,867, shows a rotary cutter that consists of concentric circular cutting discs rather than a reel-type bale. Chandler, in U.S. Pat. No. 4,345,419, discloses a self adjusting, floating reel blade mower, as does Beusink et al. in U.S. Pat. No. 3,863,429. Crotty, in U.S. Pat. No. 2,790,293, discloses a cutting mechanism consisting of rotating flanged discs in cooperation with a toothed stationary cutter bar.

Compared to the single freely rotating solid steel blade of the rotary mower, the cutting device of the reel mower is complex and expensive to produce. It is not uncommon for a powered reel mower of the sort used by golf courses to cost several thousand dollars. The need to preserve a precise gap between the reel and the bed knife is a disadvantage of the reel type mower relative to the rotary mower, since it generally requires that the mechanism be constructed of heavy-gauge, rigid materials that are capable of maintaining proper alignment throughout long-term use.

Designs have been disclosed for revolving blade cutters without an associated bed knife. Postlewait et al. in U.S. Pat. No. 3,068,632 shows a design that consists of two long thin blades affixed to the sides of a spinning horizontal roller. Another design, disclosed by Newton et al. in U.S. Pat. No. 1,837,725, shows two resilient metal blades connected to an axle, and "revolved by the rotation thereof to cut grass, the cutting being accomplished entirely by the revolving blades." The drawback inherent in both of these 'bed knife-free' designs is the same as found in the rotary mower, namely, the relative inefficiency of cutting low mass materials such as shafts of grass with purely inertial forces.

Abbrecht, in U.S. Pat. No. 2,449,042, discloses a mechanism that substitutes elongated brushes for the helical blades in the reel. The brushes provide a compliant means of sweeping the grass against the bed knife, and Abbrecht claimed more efficient, as well as quieter operation for this mechanism relative to a steel-bladed reel. The results of any attempts to reduce this design to practice are unknown.

In addition to complexity and cost, reel-type mower mechanisms suffer from another important disadvantage compared to rotary power mowers. The reel/bed knife mechanism is incapable, by itself, of mulching grass. The bed knife is set at a fixed distance to the ground and the reel sweeps each blade of grass against the bed knife only once as the mower passes. Unless a lawn is cut very frequently, any mowing system that does not mulch the cut grass generally requires that the clippings be removed for aesthetic reasons. This creates an additional task for the operator (either raking the lawn or emptying a clippings catcher), and more importantly for the health of the grass, deprives the lawn of valuable nutrients. It also creates a burden for the local municipality if the clippings are hauled away to a landfill. The practice of disposing of grass clippings, rather than mulching them, is therefore counterproductive in a compound way.

Various means have been devised for reel mowers to redirect cut pieces of grass back into the zone of the bed knife in order to be re-cut. Smith, in U.S. Pat. No. 5,400,576, discloses a mulching device for powered reel-type lawn mowers. Aske, in U.S. Pat. No. 2,599,883, discloses a clipping guide for push mowers that is meant to accomplish this task, as do Williams in U.S. Pat. No. 2,685,775, and Elliott and Johnston in U.S. Pat. No. 2,517,184. All four of these disclosures describe a cover or cowling of some sort that is intended to passively channel clippings back to the cutting zone. Perhaps because the mechanisms are passive, there is a tendency for them to become clogged, and for the re-cutting process to be haphazard.

Force, in U.S. Pat. No. 2,759,321, discloses a combined mower and mulch machine with multiple swinging blades arranged along a horizontal shaft in a manner that is superficially similar to a reel mower. The grass is cut purely by inertial forces, however, and this design suffers the same disadvantages as a powered rotary mower.

No current lawn cutting device based on the design of a reel mower is known to exist that sufficiently addresses the problem of the complexity and cost required to maintain an accurate gap between the reel and the bed knife, nor does any known design embody an intrinsic and efficient mulching function.

A few other basic cutting mechanisms have been applied to lawn mowing. One of the more successful designs entails the use of a reciprocating toothed blade in cooperation with a fixed toothed bar, in a manner similar to a hedge trimmer. Wood, in U.S. Pat. No. 468,075, discloses such a device designed to be manually operated. The Allen Scythe, produced in England from the 1930s, used a similar mechanism powered by a gasoline engine. Updated versions of the basic design are available in various models of the AL-KO Scythe Bar Mower, but their popularity seems to be largely limited to the UK, Australia, and New Zealand. This may be because the machines tend to create significant vibrations and are considered somewhat unwieldy. The exposed cutting zone at the front of the machine also represents a safety concern. These designs are also devoid of an effective mulching function.

Implements with rotating or revolving blades have been designed and used for cutting forms of vegetation much larger than grass. Rostoucher et al., in U.S. Pat. No. 6,543,210 discloses a cutting mechanism consisting of a rotor equipped with knives in recessed pockets that can be hitched to a tractor. O'Hagan, in U.S. Pat. No. 6,321,518, discloses a tubular rotor containing a plurality of swinging blades. Flail mechanisms such as these can be very effective in clearing ground of shrubs and small trees, but tend to be overkill when the task consists of removing undergrowth, rank grasses, and weeds.

Campion, in U.S. Pat. No. 1,992,119, discloses a cutting device for a lawn mower that is comprised of a pair of counter-revolving cutters that interact so that the cutting action takes place regardless of whether the mower is moved forwards or rearwards. The axes of the paired cutters, which take the form of close-tolerance nested reels, are eccentric, and the revolving cutters are active "only at the cutting plane and effective for a shearing action." As a consequence, this is not a design that embodies a mulching function.

Another bi-directional design is disclosed by Beaumont in U.S. Pat. No. 2,777,274. This document describes a mower mechanism in which a shearing bar is positioned inside a revolving cutter drum. The shearing bar is mounted "in a substantially fixed position and does not rotate with the drum" and is "mated to the inner surface of the cylindrical drum and held substantially at the height to which the vegetation is to be trimmed so that rotation of the drum forces the grass or other vegetation against the shearing bar, whereby it is trimmed off." Because the shear bar in Beaumont's design is mounted in a fixed position at the cutting height, the device is incapable of providing a mulching function.

The prior art fails to provide a vegetation cutting mechanism that combines the efficiency of metal-blade shearing action with an inherent mulching function in a device of relatively low mechanical complexity.

BRIEF SUMMARY OF THE INVENTION

One aspect of the present invention is an apparatus for cutting vegetation. The apparatus includes a reel mechanism and a cutting mechanism. The reel mechanism includes a plurality of reel bars, and the reel mechanism rotates about a central axis in a first direction. The cutting mechanism includes a plurality of cutting blades. The cutting mechanism rotates about the central axis in a second direction opposite of the rotation of the first direction. The plurality of cutting blades is disposed concentric to the plurality of reel bars.

The apparatus may further include a plurality of tines attached to each of the reel bars. The plurality of tines may preferably number ten to fifty, and each tine may preferably extend 1.0 inch to 6.0 inches outward from each of the reel bars.

The apparatus may further include a leading edge on each of the plurality of cutting blades, and a tip portion of the leading edge of each of the plurality of cutting blades having a width ranging from 0.5 inch to 0.75 inch which is bent away from the plane of the reel bars.

The cutting mechanism support assembly may be a single integral piece. The reel mechanism may be a single integral piece. The reel mechanism may be composed of a steel alloy material or a glass-reinforced nylon material. The cutting mechanism may be composed of a steel alloy material or a thermoplastic material. Each of the plurality of cutting blades may be composed of a titanium alloy material or a ceramic material. The reel mechanism may rotate in a clockwise rotation and the cutting mechanism may rotate in a counter-clockwise rotation. The cutting mechanism may rotate faster than the reel mechanism.

Another aspect of the present invention is an apparatus for cutting vegetation which includes a frame assembly, a reel mechanism and a cutting mechanism. The reel mechanism includes a plurality of reel bars, and the reel mechanism rotates about a central axis in a first direction. The reel mechanism is attached to the frame assembly. The cutting mechanism includes a plurality of cutting blades. The cutting mechanism rotates about the central axis in a second direction opposite of the rotation of the first direction. The plurality of cutting blades is disposed concentric to the plurality of reel bars. The cutting mechanism is attached to the frame assembly.

The transport mechanism may be a pair of wheels, a pair of wheels and a roller, or a set of four wheels or more. Each of the plurality of cutting blades may have a leading edge which exclusively contacts an innermost surface of each of the plurality of reel bars. A blade attachment member of each of the plurality of radial arms may include a flat portion and a raised lip portion extending substantially perpendicular to the flat portion, with the raised lip portion preventing the rearward lateral movement of an elastomeric member. Each of the plurality of radial arms may also include a removable attachment member for removable attachment of each of the cutting blades.

Yet another aspect of the present invention is a method for cutting vegetation. The method includes rotating a plurality of reel bars in a first direction relative to a central axis. The method also includes simultaneously rotating a plurality of cutting blades in a second direction relative to the central axis wherein the second direction is opposite of the first direction. The method also includes cutting vegetation by engaging a leading edge of each of the plurality of cutting blades with an innermost surface of each of the plurality of reel bars.

Yet another aspect of the present invention is an apparatus for cutting vegetation. The apparatus includes a frame assembly, a reel mechanism and a cutting mechanism with a single cutting blade. The reel mechanism is attached to the frame assembly and includes a plurality of reel bars. The reel mechanism rotates about a central axis in a first direction. The cutting mechanism with the one cutting blade rotates about the central axis in a second direction opposite of the rotation of the first direction. The one cutting blade is concentric within the plurality of reel bars and oriented helically about an entire circumference of a central tube.

By meeting these objectives, the present invention also realizes secondary advantages in terms of lower energy use and ease of operation.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
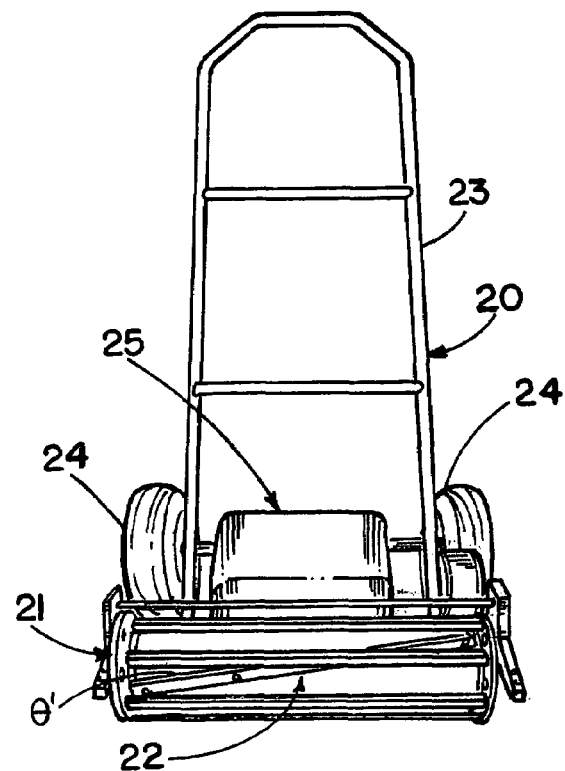
FIG. 1 is a front perspective view of a preferred embodiment of an apparatus of the present invention.
Figure 2:
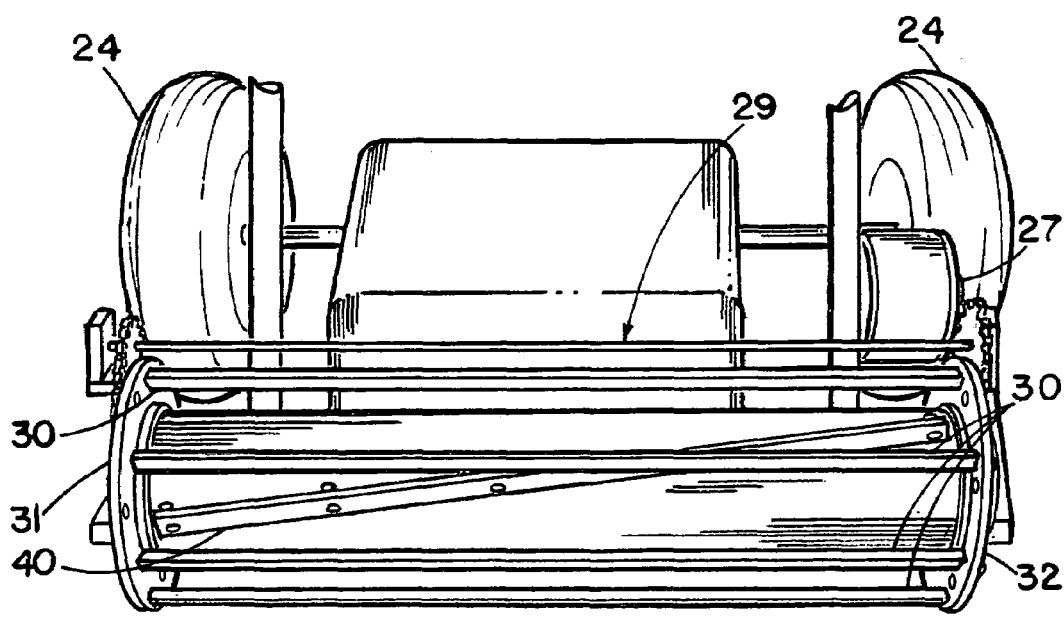
FIG. 2 is an isolated enlarged view of the apparatus of FIG. 1.
Figure 3:
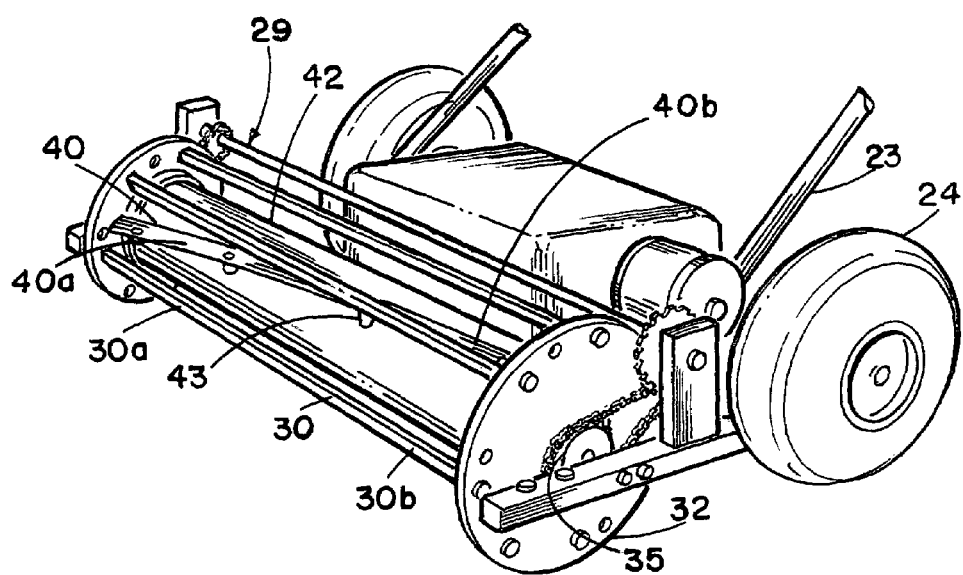
FIG. 3 is an isolated side perspective view of the apparatus of FIG. 1.

As shown in FIGS. 1-5, an apparatus of the present invention is generally designated 20. The apparatus 20 includes a reel mechanism 21 and a cutting mechanism 22. The apparatus 20 also preferably includes a frame assembly 23, a transport mechanism 24 and a power source 25.

The reel mechanism 21 preferably includes a plurality of reel bars 30 which are preferably sequentially positioned equidistant about a central axis. In a preferred embodiment, the number of plurality of reel bars 30 ranges from 3 to 20, more preferably from 5 to 10 and most preferably 7. Each of the plurality of reel bars 30 is preferably composed of a metal alloy such as a steel alloy or titanium alloy. Each of the plurality of reel bars 30 is preferably straight having a first end 30*a* and a second end 30*b*. The plurality of reel bars 30 preferably rotates about the central axis in a clockwise rotation when viewed from a left end of the apparatus 20 as the observer faces the front of the apparatus.

In preferred embodiment, the reel mechanism 21 also includes a first endplate 31 and a second endplate 32. Each of the endplates 31 and 32 has a perimeter region 33 and a center region 34. Each of the plurality of reel bars 30 is connected to the perimeter region 33 of the first endplate 31 and the second endplate 32. The reel mechanism 21 also preferably includes a power transmission component 35 for delivering rotational movement to the reel mechanism 21. The power transmission component 35 is preferably a gear, a friction wheel, a cog belt pulley or a chain sprocket. However, those skilled in the pertinent art will recognize other devices that may be utilized for the power transmission component 35 without departing from the scope and spirit of the present invention.

The cutting mechanism 22 preferably includes a plurality of cutting blades 40 which are preferably positioned about a central axis. In a preferred embodiment, the number of plurality of cutting blades 40 ranges from 1 to 10, more preferably from 2 to 5 and most preferably 2. Each of the plurality of cutting blades 40 is preferably composed of a metal alloy such as a steel alloy or titanium alloy. Each of the plurality of cutting blades 40 is preferably helical having a first end 40*a* and a second end 40*b*. The plurality of cutting blades 40 preferably rotates about the central axis in a counter-clockwise rotation when viewed from a left end of the apparatus 20 by a viewer facing the front of the apparatus.

In a preferred embodiment, the cutting mechanism 22 includes a central tube 42, a plurality of radial arms 43 extending outward from the central tube 42, and a power transmission component 44 for providing rotational movement to the cutting mechanism 22. Each of the plurality of radial arms 43 has a first end 45 and a second end 46. The first end 45 is connected to the central tube 42 and the second end 46 provides a platform for attachment of a cutting blade 40.

In a preferred embodiment, a blade 40 is attached directly to the second end 46 of each of the plurality of radial arms 43. In another preferred embodiment, a blade attachment member 47 is connected to the second end 46 of each of the plurality of radial arms 43, and a cutting blade 40 is connected to the blade attachment member 47. In an even more preferred embodiment, an elastomer member 48 is connected to the blade attachment member 47 and a cutting blade 40 is connected to the elastomer member 48. Further, in a most preferred embodiment, a removable attachment member 49 is attached to the elastomer member 48 and a cutting blade 40 is connected to the removable attachment member 49. Alternatively, the removable attachment member 49 is attached to the second end 46 of each of the plurality of radial arms 43 and a cutting blade 40 is connected to the removable attachment member 49.

Figure 5:
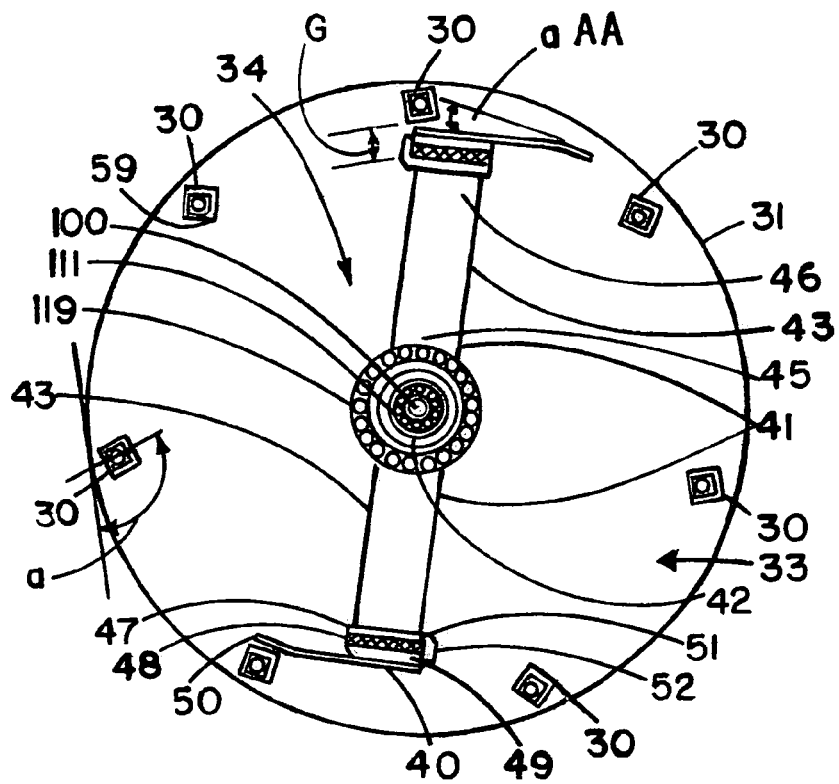
FIG. 5 is a cross-sectional view of FIG. 4.

As shown in FIG. 5, in a preferred embodiment the blade attachment member 47 has a flat portion 51 and a raised lip portion 52 which is substantially perpendicular to the flat portion 51. As described in greater detail below, the raised lip portion 52 prevents movement of the elastomer member 48 and optionally the removable attachment member 49 during operation of the apparatus 20.

In a preferred embodiment, each of the plurality of cutting blades 40 has a leading edge 50. The leading edge 50 engages an innermost surface 59 of each of the plurality of reel bars 30 to cut the vegetation, as explained in greater detail below.

Figure 7:
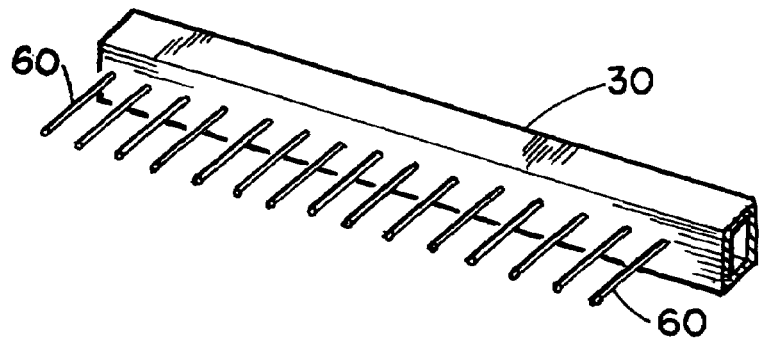
FIG. 7 is an isolated view of a reel bar with tines.

As shown in FIG. 7, in a most preferred embodiment, each of the plurality of reel bars 30 has a plurality of tines 60 extending outward to enhance the lifting of vegetation during operation. Each of the tines 60 is preferably an elongated cylindrical rod having a length ranging from 1.0 inches to 6.0 inches.

The frame assembly 23 preferably provides support for the reel mechanism 21, the cutting mechanism 22, the transport mechanism 24 and the power source 25, In a preferred embodiment, the reel mechanism 21 and the cutting mechanism 22 are positioned forward of the transport mechanism 24 and the power source 25. The power source 25 preferably includes a battery, not shown, a motor 27 and a power transmission component 29. The power source 25 provides the rotational movement for the apparatus 20. This rotational movement is preferably provided by any convenient source, including a ground-contacting friction wheel of the transport mechanism 24, a gasoline or diesel engine, a mains-powered electric motor, a battery-powered electric motor, or other similar motive source.

The frame assembly 23 preferably has a main axle 100 for attachment of the cutting mechanism 22 thereto. Also, the main axle 100 defines a central axis about which the reel mechanism 21 and the cutting mechanism 22 rotate during operation of the apparatus 20 during mowing of vegetation. The axle 100 is preferably oriented at an appropriate height parallel to the ground and perpendicular to the direction of motion of the cutting mechanism 22. A plurality of bearings 111 are preferably fixed to axle 100 and positioned so as to rotationally support the internal surfaces of opposing ends of the central tube 42. The power transmission component 44 is preferably affixed to at least one end of the central tube 42 which is preferably designed to extend in the axial direction past endplate 31. Rotational movement is preferably applied to the power transmission component 44 by a matching power transmission component, such as a cog belt, gear, friction wheel or sprocket chain, to rotate the central tube 42 at a relatively high speed counter to the direction of the ground-contacting wheels of the transport mechanism 24.

A plurality of bearings 119 are affixed to the outer surfaces of the opposing ends of the central tube 42. The bearings 119 are preferably concentric with the bearings 111, and rotationally support the first and second endplates 31 and 32. Two or more reel bars 30 are attached at their distal ends at corresponding perpendicularly opposed points near the perimeter 33 of each of the first and second endplates 31 and 32. The reel bars 30 are preferably symmetrically spaced equidistant around the perimeter 33 of each of the first and second endplates 31 and 32 so that the reel mechanism 21 is preferably rotationally balanced around the long axis of the cutter mechanism 22, which coincides with main axle 100. The reel bars 30 are attached to the first and second endplates 31 and 32 by conventional attachment means such as bolts. The power transmission component 35 (such as a cog belt pulley, gear, friction wheel or chain sprocket) is affixed to at least one of the first and second endplates 31 and 32. Rotational energy is applied to the power transmission component 35 by a matching power transmission component such as a cog belt, gear, friction wheel or sprocket chain so that the reel mechanism 21 revolves around the central tube 42 in the same direction as the ground-contacting wheels of the external transport means 24.

In a preferred embodiment, the power transmission component 44 is preferably affixed to the central tube 42 and the power transmission component 35 is affixed to the second endplate 32 at opposite ends of the cutting mechanism 22. It is equally possible, however, to place power transmission components 35 and 44 at the same end of the cutting mechanism 22, provided only that the power transmission component 44 attached to the central tube 42 is offset along the long axis of the cutting mechanism 22, coincident with the main axle 100, sufficiently beyond the outermost surface of power transmission component 35 to allow the power transmission component 44 to make unimpeded contact with an external source of motive power.

In a like manner, it is also possible to affix a power transmission component 44 to both ends of the central tube 42, and to simultaneously affix a power transmission component 35 to both first and second endplates 31 and 32, provided only that the power transmission components 44 attached to central tube 42 are offset along the long axis of the cutting mechanism 22, coincident with the main axle 100, sufficiently beyond the outermost surfaces of power transmission components 35 to allow the power transmission components 44 to make unimpeded contact with an external source of motive power.

In a preferred embodiment, each of the reel bars 30 is straight and connected at corresponding perpendicularly opposed points near the perimeter 33 of each of the first and second endplates 31 and 32. In this configuration, the radial arms 43, which connect the blade attachment surfaces 47 to the central tube 42, are angularly offset relative to each other along the axis of central tube 42 by an amount sufficient to allow the tip 53 of leading edge 50 of each of the plurality of cutting blades 40 to make initial engagement with a reel bar 30 at approximately the same instant the leading edge 50 of each of a plurality of cutting blades 40 disengages from the reel bar 30 previously encountered. Given such a gap-bridging orientation, the angle $\theta^1$ between the long axis of a cutting blade 40 and the long axis of a reel bar 30 depends both on the number of reel bars 30 in a reel mechanism 21 of fixed diameter, and on the length of each of the reel bars 30. The gap-bridging orientation also imposes a spiral or helical twist to the shape of the blade attachment surface 47, and consequently to the cutting blade 40 as well.

Both the number and the length of reel bars 30 are somewhat arbitrary, and depend in practice on the absolute size of the apparatus 20 and the type of vegetation to be cut. The number and length of reel bars 30 are selected to provide an effective shear angle $\theta^1$ between the reel bar 30 and the cutting blade 40. In order to smooth the flow of energy required by the cutting action over time, and dampen any resonant mechanical vibrations, it is advantageous to employ an odd number of reel bars 30 when there are an even number of cutting blades 40, and an even number of reel bars 30 when an odd number of cutting blades 40 are employed. As will be appreciated by those practiced in the art, it is also feasible to construct the apparatus 20 with helical reel bars 30 and straight cutting blades 40 in order to achieve the desired shear angle $\theta^1$. It is believed, however, that the construction of the mechanism is simplified by using straight reel bars 30 and helical cutting blades 40.

Referring specifically to FIG. 5, the length of each radial arm 43 is chosen so that a gap, G, exists between the top of the blade attachment surface 47 and the inner surface of each reel bar 30. This gap G must be sufficient to allow the attachment of cutting blade 40 to the blade attachment surface 47. In a preferred embodiment employing an elastomer member 48 between the blade attachment surface 47 and the cutting blade 40, the gap G must also be sufficient to allow for such a placement of components.

An angle of attack, αAA, is chosen so that only the leading edge 50 of the cutting blade 40 contacts the innermost surface 59 of the reel bar 30. Alternatively, an angle of attack αAA is obtained by disposing the top of the blade attachment surface 47 at the required angle. Further, an angle of attack αAA is obtained by attaching the cutting blade 40 to the blade attachment surface 47 so that the long axis of the cutting blade 40 is displaced forward, in the direction of rotation, relative to the long axis of the blade attachment surface 47 in such a way that cutting blade 40 is cantilevered in advance of the vertical axes of radial arms 43. Further, an angle of attack αAA is obtained by a combination of these methods.

The position of cutting blade 40 relative to each reel bar 30, and the angle of attack αAA, are further chosen in such a way as to ensure that the leading edge 50 of the cutting blade 40 is deflected very slightly inward, away from the innermost surface 59 of reel bar 30 at the point of contact, thus ensuring firm sliding contact between cutting blade 40 and reel bar 30. While the angle of attack αAA is preferably greater than zero degrees relative to the tangent of a circle described by the rotational translation through space of the innermost surface 59 of the reel bars 30, a shallow angle of attack αAA is preferred in order to minimize the danger of jamming between the cutting blade 40 and the reel bar 30.

With a reel bar 30 having flat sides as shown in FIG. 5, it is advantageous to rotate the reel bar 30 slightly about it long axis to an angle α that is greater than 90° to the tangent of the circle at the point of contact between the reel bar 30 and the cutting blade 40 on the side facing the oncoming cutting blade 40 so that an edge of the reel bar 30 contacts the leading edge 50 of the cutting blade 40, rather than some portion of the flat side of reel bar 30.

Figure 4:
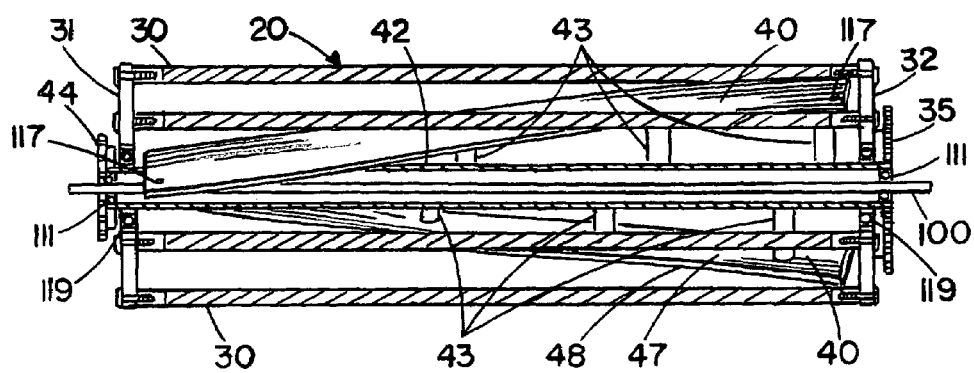
FIG. 4 is an isolated front view of a preferred embodiment of the reel mechanism and cutting mechanism of the apparatus of the present invention.

Gap G is preferably increased to accommodate more than elastomer member 48 between the blade attachment surface 47 and the cutting blade 40 without changing the angle of attack αAA. FIG. 5 shows a relatively thick elastomer member 48 in the space between the blade attachment surface 47 and the cutting blade 40 which serves to impart increased radial compliance to the cutting blade 40. FIG. 5 also illustrates a removable attachment member 49, which is provided to allow easy removal and replacement of the cutting blades 40. A preferred material for the removable attachment member 49 is VELCRO® loop and hook material. In the embodiment illustrated in FIG. 5, the blade attachment surface 47 includes a raised lip 52 at its trailing edge to ensure that the removable attachment member 49 is not displaced rearwards over time by the impact of the cutting blades 40 against vegetation being cut or the reel bars 30. Rearward displacement of blade 40 can also be avoided by the use of two or more small bolts 117 as shown in FIG. 4. The placement of elastomer member 48 and removable attachment member 49 relative to blade attachment surface 47 may be interchanged without materially changing the function each performs.

Figure 6:
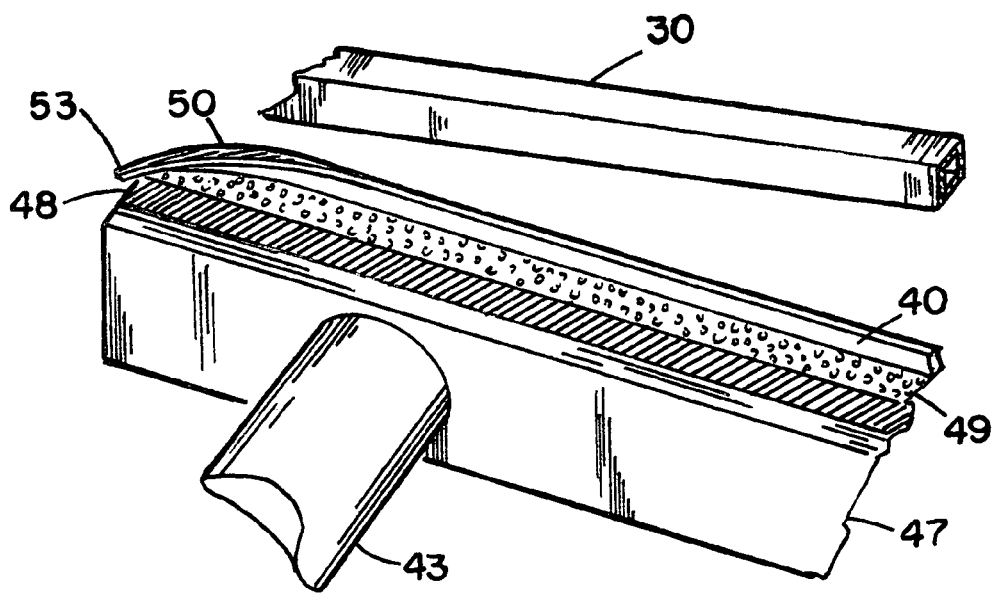
FIG. 6 is an isolated enlarged view of the cutting mechanism engaging a reel bar.

FIG. 6 shows a tip 53 of the leading edge 50 of the cutting blade 40 bent radially inward, away from the inner edges of the reel bars 30, in order to allow for gradual physical engagement between the cutting blade 40 and the reel bars 30. The linear extent of the bent portion of tip 53 depends on the overall scale of the apparatus 20, however observation and testing have led to the belief that the required extent of the bent portion of tip 53 is generally on the order of 0.5 inch to 0.75 inch.

FIG. 7 shows a plurality of tines 60 attached to each reel bar 30 pointing in the direction of rotation in order to help lift individual shafts of vegetation such as grass into the cutting plane positioned at the innermost surface of the reel bars 30.

It will be understood by those practiced in the art that although components of the cutting mechanism 22 are identified individually as central tube 42, radial arms 43, blade attachment surfaces 47, and power transmission component 44, these components may in actuality be manufactured as a single piece using, for instance, an injection molding process. In a like manner, parts of the reel mechanism 21 identified individually as first and second endplates 31 and 32, reel bars 30, and power transmission component 35 may be manufactured in combinations other than as individual parts.

The essential characteristics of the apparatus 20 are (1) the cutting blades 40 rotate inside the reel bars 30 (as opposed to the prior art in which an internal blade is fixed at the cutting height at the bottom of the assembly), and (2) the cutting blades 40 are mounted concentrically to the axis of the reel mechanism 21 and make resilient sliding contact, sequentially, with the inside edge of each reel bar 30 around the entire circumference described by the revolving reel bars 30 (i.e., the cutting plane).

Because the paired sets of cutters in the prior art are mounted eccentrically, so that they only cut at the bottom of the assembly, the prior art device cannot perform a mulching function, which is in contrast to the present invention. In a preferred embodiment, the present invention employs straight reel bars 30 and the cutting blades 40 are positioned helically.

The present invention relies on the resiliency/flexibility of at least one of the paired contacting elements (i.e., cutting blades 40 and reel bars 30) to overcome the need to maintain exact tolerances between the contacting elements. An alternative embodiment employs flexible cutting blades 40. The preferred embodiment uses relatively rigid cutting blades 40 that are resiliently attached to the elastomer member 48, which is preferably plastic foam or a metal spring. In a similar manner, the required "play" or "give" between the contacting surfaces could be provided by mounting the reel bars 30, or at least the contacting surfaces of the reel bars 30, using resilient backing such as an elastomeric material or metal springs. Alternatively, resiliency is designed into both the cutting blades 40 and the reel bars 30. An essential point is that the present invention is differentiated from the prior art reel mowers by its reliance on resiliency in one or both of the paired contacting elements to reduce the need to maintain tight tolerances between the contacting surfaces, and the concentric (rather than eccentric) mounting of the paired contacting elements which enables cutting around the entire circumference of the reel mechanism 21, thus accomplishing the mulching function.

As a consequence of the fact that the cutting blade 40 and the reel bar 30 are in contact as the cutting point moves, there is always some tension at the point of contact between the cutting blade 40 and the reel bar 30. This enables efficient scissors-like cutting action, but requires that some provision must be made to allow the cutting blade 40 to make relatively smooth initial engagement with the reel bar 30. This is preferably accomplished by bending the first 0.5 inch or so of the leading edge 50 of the cutting blade 40 inward, away from the cutting plane. (See FIG. 6.) Alternatively, the same result could be accomplished by machining a surface that curves away from the cutting plane into the first inch or so of each reel bar 30. Yet further, curves could be formed in both the tips 53 of the leading edges 50 of the cutting blades 40 and the ends of the reel bars 30.

The tension at the point of contact between the cutting blade 40 and the reel bar 30 can be intentionally made greater or less, depending on how the parts are set up, and variance in the relative geometries of the parts will also result in some (moderate) increase or decrease in this tension during operation. In other words, the tension at the point of contact normally varies within a certain range of values during operation due to mechanical variances within the mechanism.

Figure 8:
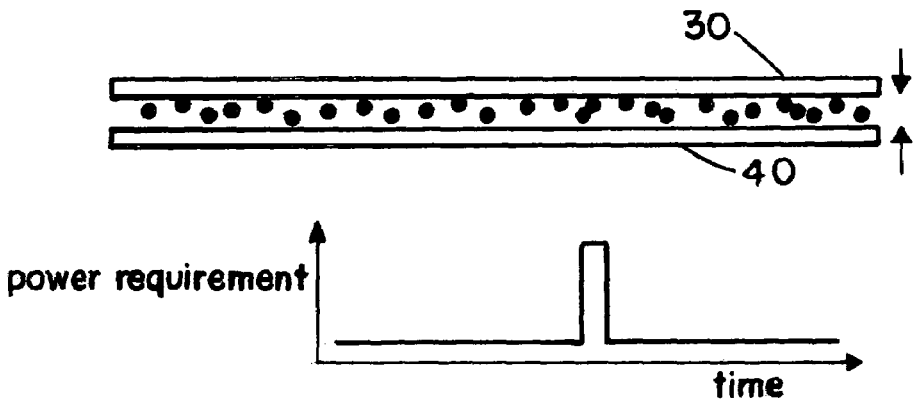
FIG. 8 is a schematic view of a comparative example of a mowing apparatus and an illustration of a power surge during a transit event.

The instantaneous angle of the long axis of a cutting blade 40 relative to the long axis of a reel bar 30 ($\theta^1$ in FIG. 1) is important in that it affects cutting efficiency as well as the power requirements over time. For example, if the blade and reel bar were parallel (as in FIG. 8), this would maximize the force vector of the shearing action compared to the vector that would tend to push the vegetation sideways. All the vegetation caught between the reel bar and the blade would be cut at the same instant, which would result in a high instantaneous power requirement, and pulsing of the power requirement of the cutting head (i.e., the reel mechanism 21 and cutting mechanism 22 combined) over time.

Figure 9:
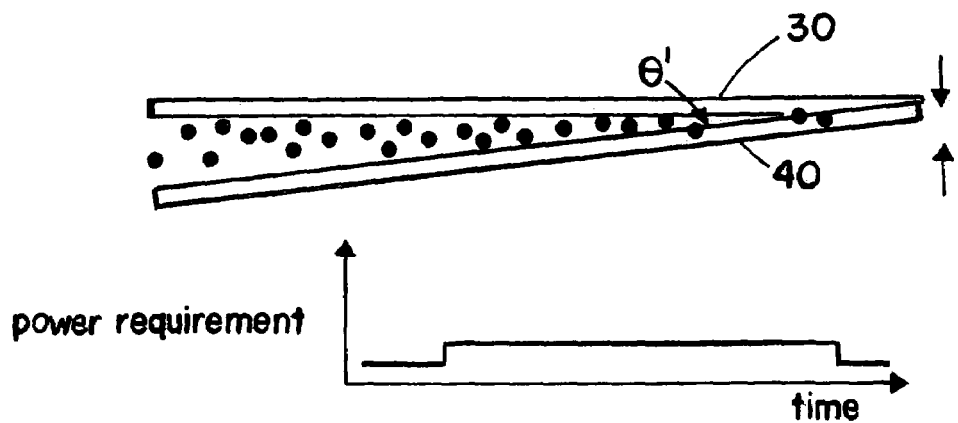
FIG. 9 is a schematic view of a cutting blade engaging a reel bar of the present invention and the power surge during the continuous transit event.
Figure 10:
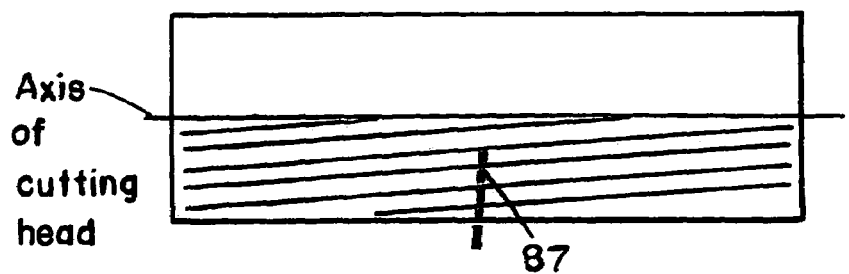
FIG. 10 is a schematic view of a blade of grass within the cutting path of the cutting mechanism of the present invention.
Figure 11:
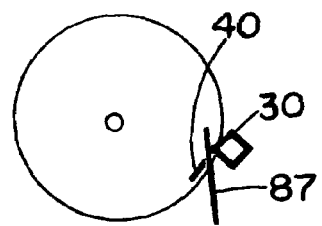
FIG. 11 is a schematic view of a first cut of a blade of grass by the apparatus of the present invention to illustrate the mulching properties of the apparatus of the present invention.
Figure 12:
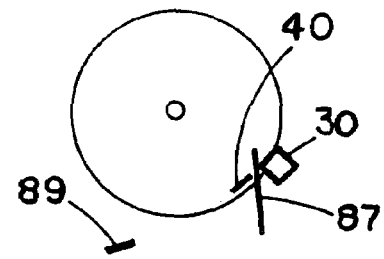
FIG. 12 is a schematic view of a second cut of the blade of grass of FIG. 11 by the apparatus of the present invention to illustrate the mulching properties of the apparatus of the present invention.
Figure 13:
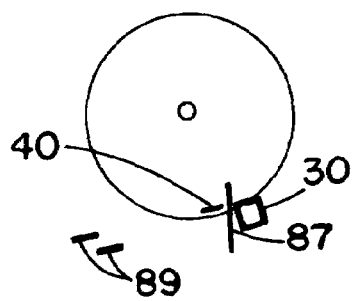
FIG. 13 is a schematic view of a third cut of the blade of grass of FIG. 11 by the apparatus of the present invention to illustrate the mulching properties of the apparatus of the present invention.
Figure 14:
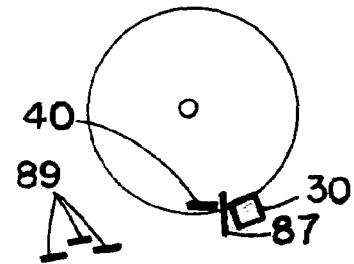
FIG. 14 is a schematic view of a fourth cut of the blade of grass of FIG. 11 by the apparatus of the present invention to illustrate the mulching properties of the apparatus of the present invention.

In the present invention, the angle $\theta^1$ is greater than zero, as in FIG. 9, and vegetation caught between the reel bar 30 and the cutting blade 40 is cut sequentially. As long as the angle $\theta^1$ remains relatively small, the shearing force vector stays relatively large compared to the sliding force vector and cutting is relatively efficient. The instantaneous power requirement of the cutting head is reduced, and although slightly more total power is required (due to the increase of the sliding force vector) the power requirement is spread out over a greater time period, reducing power pulsations.

In practice, if the angle $\theta^1$ is selected so that a cutting blade 40 bridges the gap between successive reel bars 30, and the apparatus 20 contains an even number of cutting blades 40 and an odd number of reel bars 30 (or an odd number of cutting blades 40 and an even number of reel bars 30), the power curves for each successive blade/bar transit overlap and the total power requirement for the cutting head is further smoothed over time for a cutting head, for instance, with two cutting blades 40 and seven reel bars 30.

In an apparatus 20 in which a blade 40 bridges the gap between adjacent reel bars 30, the absolute angle $\theta^1$ can be decreased by adding additional reel bars 30 around the circumference of the cutting head, or by maintaining the same number of reel bars 30 and increasing the width of the cutting head relative to its diameter. As a consequence, there is great latitude in selecting the proportions of the various elements of the cutting head to optimize operation for different applications.

The actual cutting path described by the sliding point of contact between cutting blade 40 and reel bar 30 is a function of their relative angles as well as their relative speed. If the reel bar 30 were to be held fixed in space, the actual cutting path would coincide with the long axis of the reel bar 30. Conversely, if the cutting blade 40 were to be held fixed in space, the actual cutting path would coincide with the long axis of the cutting blade 40. In the case where the reel bars 30 and cutting blades 40 are converging (counter-rotating), the angle of the actual cutting path ($\theta^2$) is some fraction of $\theta^1$.

As a consequence, as the cutting head moves across the ground, vegetation is cut in three dimensions. In the vertical direction, each stalk of vegetation is cut several times as the contact point traverses the length of each reel bar 30 in succession, as illustrated in FIGS. 11-14. The blade of grass 87 is cut by cutting blades 40 and the reel bars 30 successive times to create mulch pieces 89.

Figure 15:
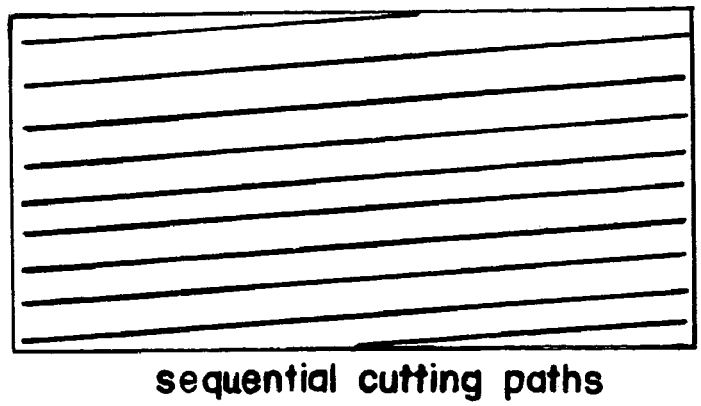
FIG. 15 is a schematic view of the sequential cutting path of the apparatus of the present invention.

Viewed from above, cutting action takes place along a sequence of diagonal paths, shown in FIG. 15 as projections on the surface of the ground as the cutting head traverses across the area.

FIG. 15 shows only the cutting paths closest to ground level. The distance between cutting paths and the angle of each path relative to the direction of travel of the cutting head are functions of both the speed of rotation of the reel bars 30 and cutting blades 40, and the speed at which the cutting head assembly traverses the ground.

Figure 16:
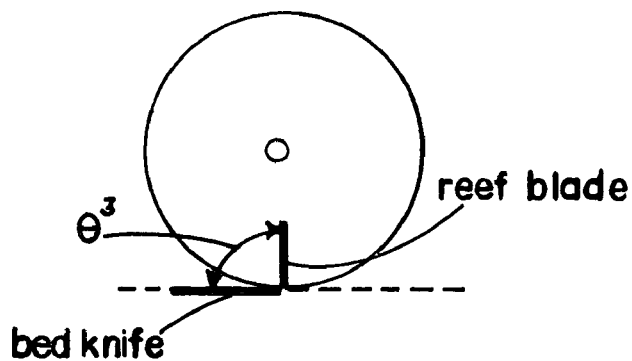
FIG. 16 is a schematic view of an angle of attack of a prior art mowing apparatus.

The "angle of attack" at which the blade meets the reel bar is also relevant. In a prior art reel-type lawn mower, the angle of attack ($\theta^3$) is essentially 90° to the tangent of the reel circumference at the point of contact with the bed knife, as shown in FIG. 16.

Figure 17:
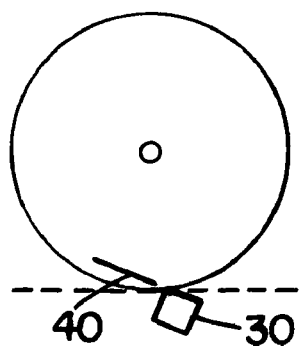
FIG. 17 is a schematic view of an angle of attack of an apparatus of the present invention.
Figure 18:
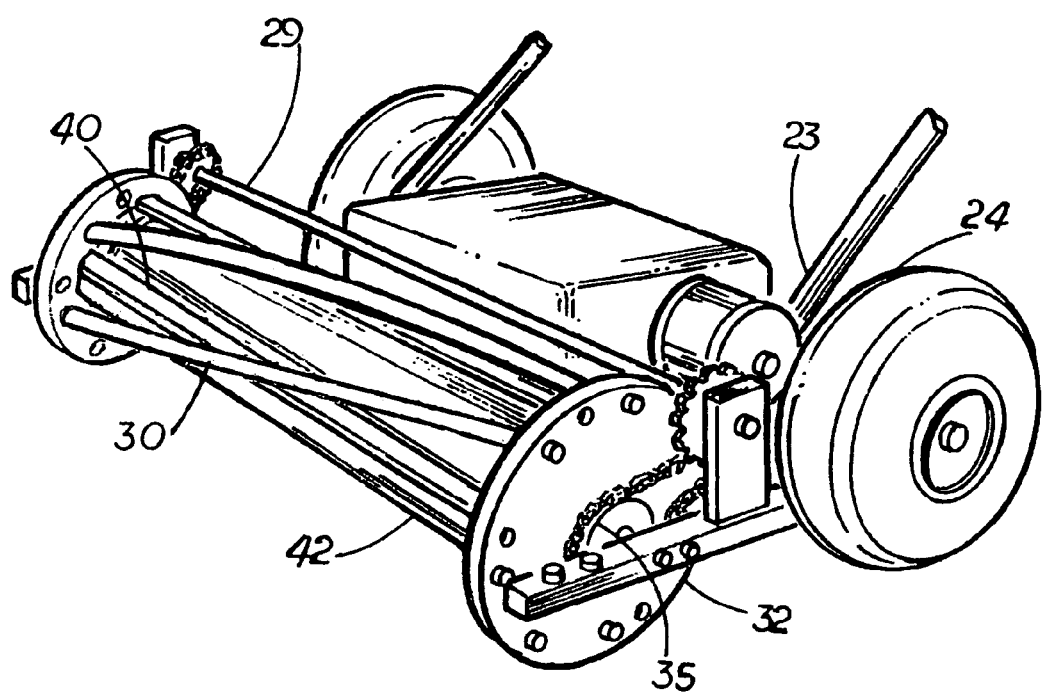
FIG. 18 is an isolated side perspective view of an alternative embodiment of the apparatus of the present invention.
Figure 19:
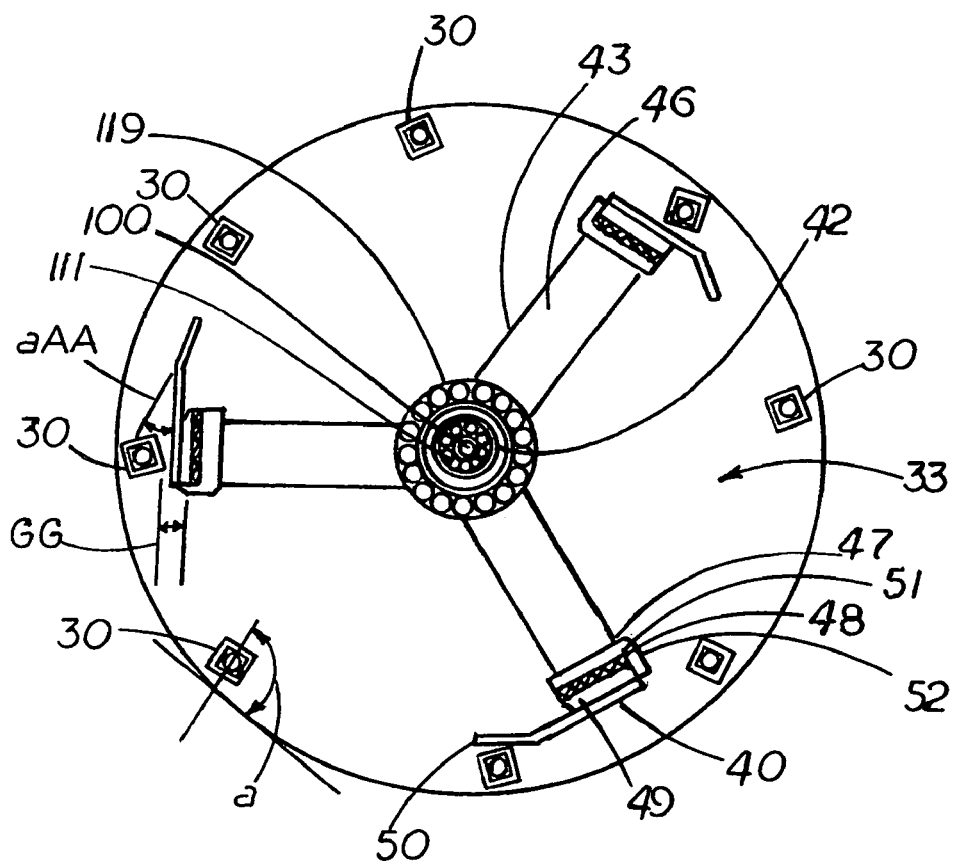
FIG. 19 is a cross-sectional view of an alternative embodiment of the reel mechanism and cutting mechanism of the apparatus of the present invention.

In the present invention, the angle of attack $\alpha AA$ is very shallow by comparison, as shown in FIG. 17. Each reel bar 30 is rotated around its long axis so as to present an edge, rather than a flat face, to the cutting blade 40.

At higher angles of attack $\alpha AA$ the potential for jamming between the cutting blade 40 and the edge of the reel bar 30 increases. Narrower cutting blades 40 allow shallower angles of attack $\alpha AA$, but also tend to minimize flexibility across the short axis. The design of the cutting head is optimized in practice by the judicious selection of materials to allow blade resilience while minimizing the angle of attack $\alpha AA$. The angle of attack $\alpha AA$ can also be reduced by increasing the diameter of the cutting head relative to the width of the cutting blades 40.

EXAMPLE

A plurality of reel bars 30 is each preferably constructed of 0.5 inch steel angle ('L') stock. Each reel bar 30 is preferably 22.75 inches in length. (All measurements are approximate.) A one inch long ¼-20 coupling nut is preferably brazed to the end of each reel bar 30 to allow attachment of the reel bar 30 to the first and second endplates 31 and 32 by a ¼-20 bolt. Each of the first and second endplates 31 and 32 is preferably seven inches in diameter and 0.18 inch thick. The first and second endplates 31 and 32 are preferably composed of an aluminum alloy material, and a 1¼ inch diameter roller bearing 119 is set into the center of each of the endplates 31 and 32. The bearings ride on a 0.5 inch diameter copper tube that serves as the axle for the cutting mechanism support assembly 41. The reel mechanism 21 contains seven reel bars 30.

The two cutting blades 40 are each preferably 22.0 inches in length, 1.0 inch wide, and 0.03 inches thick, and preferably composed of hardened silicon steel. Each cutting blade 40 is supported at 2.0 inch intervals by a bolt head 117 that clamps the trailing edge of the cutting blade 40 to the top of a 0.675 inch long nylon radial arm 43. Each cutting blade 40 is supported by twelve radial arms 43, and the nylon radial arms 43 are in turn attached in a helical path around the long axis of a 4.0 inches diameter central tube 42 composed of an ABS plastic with a wall thickness on 0.25 inch. The two cutting blades 40 are positioned on opposite sides of the central tube 42, which is in turn supported by endplates composed of PVC on a 0.5 inch diameter copper tube. The 0.5 inch diameter copper tube is supported at each end by a roller bearing 111 that rides on a ⁵⁄₁₆-inch diameter steel axle 100. The main axle 100 is preferably attached to the frame assembly 23 at each end by two steel nuts.

Other examples of the apparatus 20 could be larger or smaller, depending on the intended end use. For instance, the reel bars 30 for a compact apparatus 20 (for a small lawn) are 15 inches in length, although the diameter of the reel mechanism 21 would not likely be reduced much below 6 inches. At the other end of the spectrum, for agricultural and forestry applications, the apparatus 20 has reel bars 30 and cutting blades 40 eight feet in length, and first and second endplates 31 and 32 with a diameter of four feet.

A single 24V DC motor provides motive power for both the reel mechanism 21 and the cutting mechanism 22 through a simple chain drive assembly. The gearing of the chain drive assembly provides for approximately four revolutions of the cutting mechanism 22 for every one revolution of the reel mechanism 21. Power is provided by two 12V 9AH/20 hr. deep discharge batteries connected in series. Power is delivered to the motor via a solid state variable speed circuit that is controlled by a lever on the handle of the frame assembly 23 of the apparatus 20. At around 12V from the variable speed control, the motor consumes approximately 6 amps. The batteries in the example deliver energy that is more than sufficient to cut a moderate growth of grass on a lawn with dimensions of 100×100 feet. The batteries can be recharged using an AC charger about the size of a typical laptop computer power supply in approximately 10 hours. The batteries can also be recharged using a photovoltaic panel.

In an alternative embodiment, each of the plurality of reel bars 30 is composed of multiple pieces such as a replaceable metal strip mounted on a rubber base removably attached to the reel bar 30.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. An apparatus for cutting vegetation, the apparatus comprising:
   a reel mechanism comprising a plurality of reel bars, the reel mechanism rotating about a central axis in a first direction; and
   a cutting mechanism comprising a plurality of cutting blades, the cutting mechanism rotating about the central axis in a second direction opposite of the rotation of the first direction, the plurality of cutting blades concentric to the plurality of reel bars;

wherein each of the plurality of reel bars is straight and each of the plurality of cutting blades is helical;

wherein the plurality of reel bars and the plurality of cutting blades are configured and arranged to contact each other to cut vegetation therebetween; and wherein the contact between the plurality of reel bars and the plurality of cutting blades is resilient sliding contact.

2. The apparatus according to claim 1 wherein there is an odd number of reel bars and an even number of cutting blades.

3. The apparatus according to claim 1 wherein there is an even number of reel bars and an odd number of cutting blades.

4. The apparatus according to claim 1 wherein there are seven reel bars and two cutting blades.

5. The apparatus according to claim 1 wherein the cutting mechanism further comprises a cutting mechanism support assembly, each of the plurality of cutting blades attached to the cutting mechanism support assembly.

6. The apparatus according to claim 5 wherein the cutting mechanism support assembly comprises a central tube, a plurality of radial arms extending outward from the central tube, and a power transmission component for providing rotational movement to the cutting mechanism.

7. The apparatus according to claim 6 wherein each of the plurality of radial arms has a first end connected to the central tube and a second end opposite the first end, each of the plurality of radial arms further comprising a blade attachment member connected to the second end of the radial arm, each of the plurality of cutting blades connected to a blade attachment member.

8. The apparatus according to claim 7 wherein each of the plurality of radial arms further comprises an elastomeric member disposed between each cutting blade and the blade attachment member.

9. The apparatus according to claim 6 wherein the power transmission component of the cutting mechanism support assembly is a cog belt pulley, a chain sprocket, gear or friction wheel.

10. The apparatus according to claim 1 wherein the reel mechanism further comprises a first end plate and a second end plate, wherein each of the plurality of reel bars has a first end connected, to the first end plate and a second end connected to the second end plate.

11. The apparatus according to claim 10 wherein the first end plate and the second end plate are circular in shape having a perimeter and a center, and wherein each of the plurality of reel bars is positioned at the perimeter of the first end plate and the second end plate equidistant from each other.

12. The apparatus according to claim 10 wherein the reel mechanism further comprises a power transmission component for providing rotational movement to the reel mechanism.

13. The apparatus according to claim 12 wherein the power transmission component of the reel mechanism is a cog belt pulley, a chain sprocket gear or friction wheel.

14. The apparatus according to claim 1 wherein each of the plurality of cutting blades has a leading edge, the leading edge exclusively contacting an innermost surface of each of the plurality of reel bars.

15. The apparatus according to claim 8 wherein the blade attachment member of each of the plurality of radial arms comprises a flat portion and a raised lip portion extending substantially perpendicular to the flat portion, the raised lip portion preventing the movement of the elastomeric member.

16. The apparatus according to claim 6 wherein each of the plurality of radial arms has a first end connected to the central tube and a second end opposite the first end, each of the plurality of radial arms further comprising a removable attachment member connected to the second end of the radial arm, each of the plurality of cutting blades removably connected to a removable attachment member.

17. The apparatus according to claim 14 wherein each of the plurality of cutting blades is oriented at an angle that is less than thirty degrees relative to a tangent of a circle defined by a rotational translation through space of the innermost surface of each of the plurality of reel bars.

18. The apparatus according to claim 14 wherein the leading edge of each of the plurality of cutting blades has a tip portion that is bent radially inward for gradual engagement of the leading edge with each of the plurality of reel bars.

19. The apparatus according to claim 1 wherein the reel mechanism rotates at 50 to 90 rotations per minute and the cutting mechanism rotates at 200 to 360 rotations per minute.

20. The apparatus according to claim 1 wherein the cutting mechanism rotates at four times the rotation of the reel mechanism.

21. The apparatus according to claim 1 wherein the plurality of cutting blades engages the plurality of reel bars 3000 to 4000 transits per minute.

22. The apparatus according to claim 7 wherein a portion of each of the plurality of cutting blades extends forward of the blade attachment member.

23. An apparatus for cutting vegetation, the apparatus comprising:

a frame assembly;

a reel mechanism attached to the frame assembly, the reel mechanism comprising a plurality of reel bars, the reel mechanism rotating about a central axis in a first direction; and a cutting mechanism comprising a plurality of cutting blades, the cutting mechanism rotating about the central axis in a second direction opposite of the rotation of the first direction, the plurality of cutting blades concentric within the plurality of reel bars;

wherein each of the plurality of cutting blades is oriented at an angle that is less than thirty degrees relative to a tangent of a circle defined by a rotational translation through space of an innermost surface of each of the plurality of reel bars.

24. The apparatus according to claim 23 further comprising a power source attached to the frame assembly and in rotational movement communication with the reel mechanism and the cutting mechanism.

25. The apparatus according to claim 23 further comprising a transport mechanism attached to the frame assembly.

26. The apparatus according to claim 23 wherein the cutting mechanism further comprises a cutting mechanism support assembly, each of the plurality of cutting blades attached to the cutting mechanism support assembly.

27. The apparatus according to claim 26 wherein the cutting mechanism support assembly comprises a central tube, a plurality of radial arms extending outward from the central tube, and a power transmission component for providing rotational movement to the cutting mechanism.

28. The apparatus according to claim 27 wherein each of the plurality of radial arms has a first end connected to the central tube and a second end opposite the first end, each of the plurality of radial arms further comprising a blade attachment member connected to the second end of the radial arm, each of the plurality of cutting blades connected to a blade attachment member.

29. The apparatus according to claim 28 wherein each of the plurality of radial arms further comprises an elastomeric member disposed between each cutting blade and the blade attachment surface.

30. The apparatus according to claim 27 wherein a power transmission component of the cutting mechanism support assembly is connected to the power source.

31. The apparatus according to claim 23 wherein the reel mechanism further comprises a first end plate and a second end plate, wherein each of the plurality of reel bars has a first end connected to the first end plate and a second end connected to the second end plate.

32. The apparatus according to claim 31 wherein the first end plate and the second end plate are circular in shape having a perimeter and a center, and wherein each of the plurality of reel bars is positioned at the perimeter of the first end plate and the second end plate equidistant from each other.

33. The apparatus according to claim 24 wherein the reel mechanism further comprises a power transmission component for providing rotational movement to the reel mechanism, and the power transmission component is connected to the power source.

34. The apparatus according to claim 23 wherein the leading edge of each of the plurality of cutting blades has a tip portion that is bent radially inward for gradual engagement of the leading edge with each of the plurality of reel bars.

35. The apparatus according to claim 23 wherein each of the plurality of reel bars further comprises a plurality of tines, each of the plurality of tines extending outward in the direction of rotation of the reel mechanism.

36. The apparatus according to claim 23 wherein the reel mechanism rotates at 50 to 90 rotations per minute and the cutting mechanism rotates at 200 to 360 rotations per minute.

37. The apparatus according to claim 23 wherein the plurality of cutting blades engages the plurality of reel bars 3000 to 4000 transits per minute.

38. An apparatus for cutting vegetation, the apparatus comprising:
a reel mechanism comprising a plurality of reel bars, the reel mechanism rotating about a central axis in a first direction; and
a cutting mechanism comprising a plurality of cutting blades, the cutting mechanism rotating about the central axis in a second direction opposite of the rotation of the first direction, the plurality of cutting blades concentric to the plurality of reel bars;
wherein each of the plurality of reel bars is helical and each of the plurality of cutting blades is straight;
wherein the plurality of reel bars and the plurality of cutting blades are configured and arranged to contact each other to cut vegetation therebetween; and
wherein the contact between the plurality of reel bars and the plurality of cutting blades is resilient sliding contact.

39. The apparatus according to claim 38 wherein there is an odd number of reel bars and an even number of cutting blades.

40. The apparatus according to claim 38 wherein there is an even number of reel bars and an odd number of cutting blades.

41. The apparatus according to claim 38 wherein the cutting mechanism further comprises a cutting mechanism support assembly, each of the plurality of cutting blades attached to the cutting mechanism support assembly.

42. The apparatus according to claim 41 wherein the cutting mechanism support assembly comprises a central tube, a plurality of radial arms extending outward from the central tube, and a power transmission component for providing rotational movement to the cutting mechanism.

43. The apparatus according to claim 42 wherein each of the plurality of radial arms has a first end connected to the central tube and a second end opposite the first end, each of the plurality of radial arms further comprising a blade attachment member connected to the second end of the radial arm, each of the plurality of cutting blades connected to a blade attachment member.

44. The apparatus according to claim 43 wherein each of the plurality of radial arms further comprises an elastomeric member disposed between each cutting blade and the blade attachment member.

45. The apparatus according to claim 42 wherein the power transmission component of the cutting mechanism support assembly is a cog belt pulley, a chain sprocket, gear or friction wheel.

46. The apparatus according to claim 38 wherein the reel mechanism further comprises a first end plate and a second end plate, wherein each of the plurality of reel bars has a first end connected to the first end plate and a second end connected to the second end plate.

47. The apparatus according to claim 1, wherein the plurality of straight reel bars of the reel mechanism rotate completely about the central axis.

48. The apparatus according to claim 38, wherein the plurality of straight cutting blades of the cutting mechanism rotate completely about the central axis.

* * * * *